(12) United States Patent
Kim et al.

(10) Patent No.: US 11,884,237 B2
(45) Date of Patent: Jan. 30, 2024

(54) FACIAL RECOGNITION SYSTEM AND CONTROLLING METHOD THEREOF

(71) Applicants: HYUNDAI MOTOR COMPANY, Seoul (KR); KIA MOTORS CORPORATION, Seoul (KR)

(72) Inventors: Hyunsang Kim, Hwaseong-si (KR); YunSup Ann, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/145,633

(22) Filed: Jan. 11, 2021

(65) Prior Publication Data
US 2022/0055573 A1    Feb. 24, 2022

(30) Foreign Application Priority Data

Aug. 20, 2020   (KR) .................. 10-2020-0104595

(51) Int. Cl.
| | |
|---|---|
| *B60R 25/25* | (2013.01) |
| *B60R 25/31* | (2013.01) |
| *G01J 5/00* | (2022.01) |
| *B60R 25/30* | (2013.01) |
| *G06V 40/16* | (2022.01) |
| *G08B 13/196* | (2006.01) |

(52) U.S. Cl.
CPC ............ *B60R 25/25* (2013.01); *B60R 25/305* (2013.01); *B60R 25/31* (2013.01); *G01J 5/0025* (2013.01); *G06V 40/172* (2022.01); *G08B 13/19695* (2013.01)

(58) Field of Classification Search
CPC ....... B60R 25/25; B60R 25/305; B60R 25/31; G06V 40/172; G01J 5/0025; G08B 13/19695
See application file for complete search history.

(56) References Cited

U.S. PATENT DOCUMENTS

| | | | |
|---|---|---|---|
| 9,230,440 B1 * | 1/2016 | Penilla ................... | B60L 53/66 |
| 9,707,912 B1 * | 7/2017 | Pena Casimiro .... | B60Q 1/2665 |
| 10,131,323 B1 * | 11/2018 | Sterling ................. | B60R 25/01 |
| 10,717,412 B2 * | 7/2020 | Abel Rayan .......... | H04W 12/68 |
| 10,821,937 B1 * | 11/2020 | Salter .................... | B60R 25/245 |
| 2012/0123649 A1 * | 5/2012 | Eggers ................... | E05F 15/73 |
| | | | 701/49 |

(Continued)

FOREIGN PATENT DOCUMENTS

| | | | |
|---|---|---|---|
| CN | 202261626 U | * | 5/2012 |
| JP | 2006223174 A | * | 8/2006 |

*Primary Examiner* — Mohamed Barakat
*Assistant Examiner* — Rufus C Point
(74) *Attorney, Agent, or Firm* — Morgan, Lewis & Bockius LLP (57) ABSTRACT

In accordance with an aspect of disclosure, the vehicle includes a first sensor configured to measure a distance to an object; a second sensor configured to measure a temperature of the object; a camera configured to acquire an image of the object; and a controller configured to activate the second sensor when the distance to the object measured by the first sensor satisfies the condition for performing heat detection, and activate the camera when the temperature of the object measured by the second sensor satisfies a condition for performing facial recognition.

20 Claims, 10 Drawing Sheets

(56) References Cited

U.S. PATENT DOCUMENTS

| | | | |
|---|---|---|---|
| 2015/0262436 A1* | 9/2015 | Herthan | B60R 25/24 340/5.72 |
| 2017/0166166 A1* | 6/2017 | Lindic | B60R 25/30 |
| 2018/0126951 A1* | 5/2018 | Ricci | B60W 40/09 |
| 2019/0143936 A1* | 5/2019 | Abel Rayan | B60R 25/10 701/2 |
| 2020/0180561 A1* | 6/2020 | Lane | G06V 40/103 |
| 2020/0238952 A1* | 7/2020 | Lindsay | G06V 30/194 |

\* cited by examiner

FACIAL RECOGNITION SYSTEM AND CONTROLLING METHOD THEREOF

CROSS-REFERENCE TO RELATED APPLICATION(S)

This application is based on and claims the benefit of priority to Korean Patent Application No. 10-2020-0104595, filed on Aug. 20, 2020 in the Korean Intellectual Property Office, the disclosure of which is incorporated by reference in its entirety.

TECHNICAL FIELD

The present disclosure relates to a vehicle and a controlling method thereof, and more particularly, to a facial recognition system of a vehicle and a controlling method capable of effectively control a camera.

BACKGROUND

Vehicles equipped with various additional functions are being developed in consideration of user convenience and safety.

More specifically, one of the existing vehicle access methods includes a physical method of directly inserting a key into a vehicle. Recently, technologies that allow access to a vehicle in a more convenient manner, such as a smart key and a digital key, which are recognized wirelessly at a certain distance outside the vehicle and control the unlocking of the door, have been developed.

In addition, as a convenience function of the vehicle for the user, not only when using keys such as smart keys and digital keys, but also when the user does not have the key, there is an attempt to enable user authentication using a camera to unlock the vehicle door.

However, there is a problem that the camera always operates to generate a leakage current, and camera's activate from time to time due to false detection.

SUMMARY

An aspect of the present disclosure provides a vehicle and a control method thereof that capable of activating a camera depending on whether an object approaching from outside the vehicle is a person. Accordingly, an aspect of the present disclosure is possible to prevent the occurrence of leakage current and frequent activating of the camera, thereby preventing power consumption.

In accordance with an aspect of the present disclosure, a vehicle may include: a first sensor configured to measure a distance to an object; a second sensor configured to measure a temperature of the object; a camera configured to acquire an image of the object; and a controller configured to activate the second sensor when the distance to the object measured by the first sensor satisfies the condition for performing heat detection, and activate the camera when the temperature of the object measured by the second sensor satisfies a condition for performing facial recognition.

The vehicle may further include a door locking device configured to lock a door of the vehicle or unlock the door, and the processor may be configured to control the door locking device based on the acquired image from the camera.

The processor may be configured to control the door locking device to unlock the door when a similarity between the image acquired from the camera and a reference image is greater than or equal to a preset value.

The processor may be configured to determine whether to activate the second sensor based on a distance to the object at a first time point and a distance to the object at a second time point.

The processor may be configured to activate the second sensor when a value obtained by subtracting the distance to the object at the second time point from the distance to the object at the first time point is equal to or greater than a preset value.

The processor may be configured to activate the camera when the temperature of the object is within a preset temperature range.

The vehicle may further include an illuminance sensor configured to measure a brightness around the vehicle; and the processor may be configured to activate the illuminance sensor when the temperature of the object measured by the second sensor falls within a present temperature range.

The vehicle may further include a light-emitting element provided in the camera; and the processor may be configured to drive the light-emitting element based on brightness around the vehicle.

The processor may be configured to turn off the second light sensor when the temperature of the object measured from the second sensor is outside a present temperature range.

The processor may be configured to turn off the second sensor and the camera when the similarity between the image acquired from the camera and a reference image is less than a preset value.

The camera may be provided on a B-pillar or A-pillar of the vehicle.

In accordance with an aspect of the present disclosure, a controlling method of a vehicle may include: measuring a distance to an object by a first sensor; activating a second sensor when the distance to the object satisfies a thermal sensing performance condition; measuring a temperature of the object by the second sensor; and activating a camera when the temperature of the object satisfies a condition for performing facial recognition.

The method may further include controlling a door locking device based on the acquired image from the camera.

The controlling the door locking device may include unlocking the door when a similarity between the image acquired from the camera and a reference image is greater than or equal to a preset value.

The method may further include determining whether to activate the second sensor based on a distance to the object at a first time point and a distance to the object at a second time point.

The determining whether to activate the second sensor may include activating the second sensor when a value obtained by subtracting the distance to the object at the second time point from the distance to the object at the first time point is equal to or greater than a preset value.

The activating the camera may include activating the camera when the temperature of the object is within a preset temperature range.

The method may further include activating an illuminance sensor when the temperature of the object measured by the second sensor falls within a preset temperature range.

The method may further include measuring a brightness around the vehicle by the illuminance sensor and driving a light-emitting element based the brightness around the vehicle The method may further include turning off the second light sensor when the temperature of the object measured from the second sensor is outside a present temperature range.

The method may further include turning off the second sensor and the camera when the similarity between the image acquired from the camera and a reference image is less than a preset value.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Like reference numerals refer to like elements throughout. The present disclosure does not describe all elements of the embodiments, and overlaps between the general contents or the embodiments in the technical field to which the present disclosure belongs. This specification does not describe all elements of the exemplary embodiments of the present disclosure and detailed descriptions on what are well known in the art or redundant descriptions on substantially the same configurations may be omitted. The term 'part, module, member, block' used in the specification may be implemented in software or hardware, and a plurality of 'part, module, member, block' may be embodied as one component. It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network.

In addition, when a part is said to "include" a certain component, this means that it may further include other components, except to exclude other components unless otherwise stated.

Throughout the specification, when a member is located "on" another member, this includes not only when one member is in contact with another member but also when another member exists between the two members.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and embodiments of the present disclosure.

Figure 1:
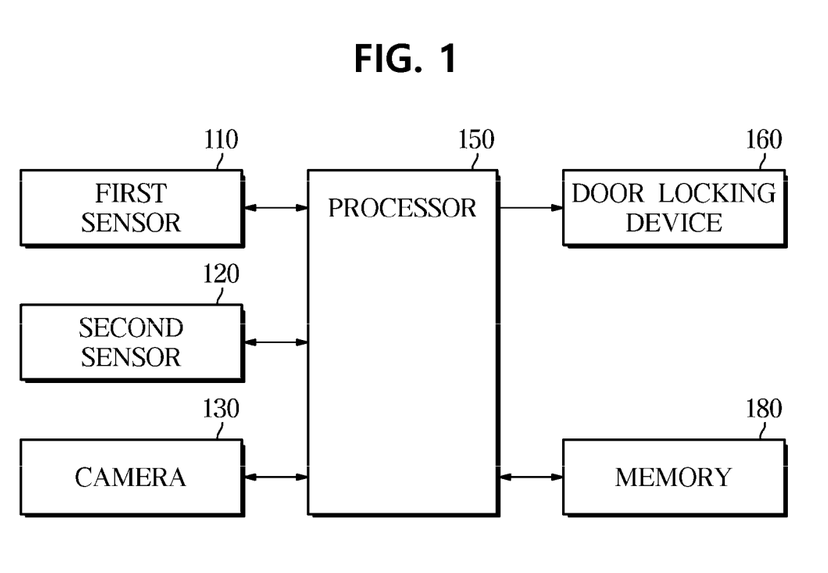
FIG. 1 is a control block diagram of a vehicle according to an exemplary embodiment of the present disclosure.
Figure 2:
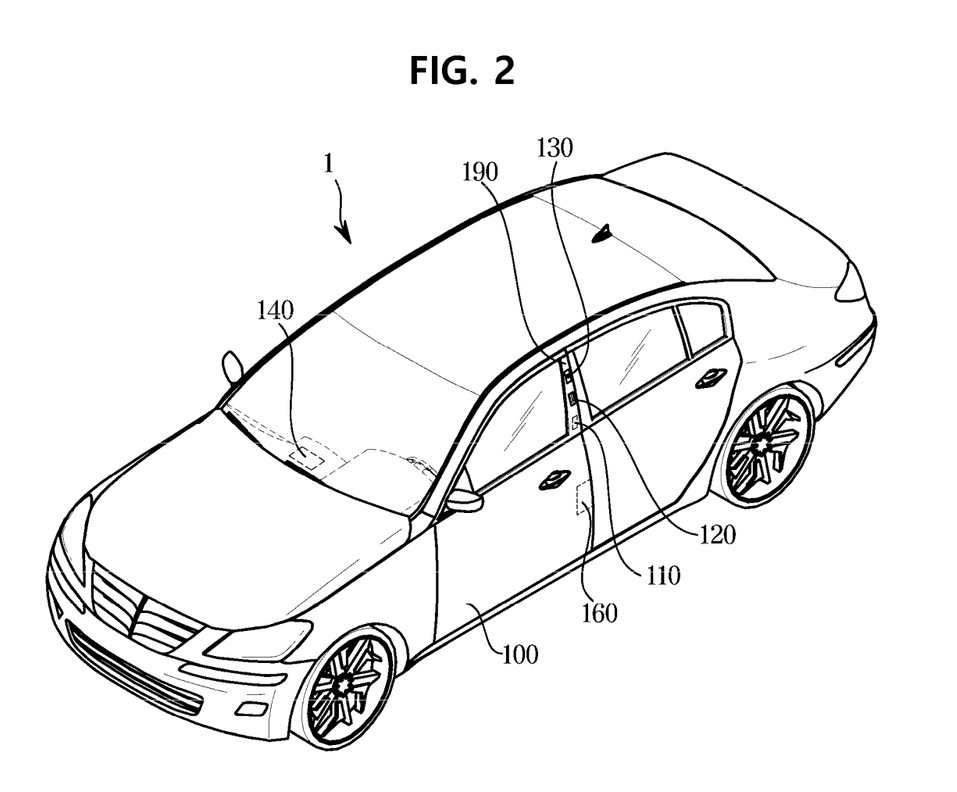
FIG. 2 is a diagram illustrating an exterior of a vehicle according to an exemplary embodiment of the present disclosure.

FIG. 1 is a control block diagram of a vehicle according to an exemplary embodiment of the present disclosure. FIG. 2 is a diagram illustrating an exterior of a vehicle according to an exemplary embodiment of the present disclosure.

Referring to FIGS. 1 and 2, the vehicle 1 according to the disclosed embodiment includes a door 100, a first sensor 110, a second sensor 120, a camera 130, an illuminance sensor 140, a processor. 150, a door locking device 160, a memory 180, and a B-pillar 190.

The door 100 is provided to be rotatable on the left and right sides of the vehicle 1 so that the user can board the inside of the vehicle 1 when opened, and shields the inside of the vehicle 1 from the outside when closed.

The first sensor 110 may measure a distance to an external object of the vehicle 1, and may output the measured distance information to the object to the processor 150. In addition, the first sensor 110 may measure the distance to the object at the first time point and the distance to the object at the second time point, and may output distance information to the object at a first time point and distance information to the object at a second time point to the processor 150.

In this case, the first sensor 110 may be one of an ultrasonic sensor or a radar sensor, and other types of sensors other than the above-described sensor. When the first sensor 110 is an ultrasonic sensor, the first sensor 110 may include an ultrasonic transmitter and an ultrasonic receiver. In this case, the first sensor 110 may measure a distance to the object by receiving an echo signal returned by reflecting the transmitted signal to the object.

The first sensor 110 may operate in a polling method to minimize power consumption. For example, the first sensor 110 may change the operating frequency to a period of 100 ms when an object is detected while the operating frequency is usually set at 300 ms intervals.

The second sensor 120 may measure the temperature of an object outside the vehicle 1 and output the measured temperature information of the object to the processor 150. The second sensor 120 may be a heat sensor capable of detecting heat of an object, and may be provided on the B-pillar 190 or the A-pillar of the vehicle 1.

The camera 130 may acquire an image of an external object of the vehicle 1 and may output the acquired image information of the object to the processor 150. The camera 130 may be provided on a B-pillar 190 or an A-pillar of the vehicle 1.

The illuminance sensor 140 may measure the brightness around the vehicle 1. The illuminance sensor 140 may measure the density of the light flux incident on the sensor, and may be provided on the top of the dashboard of the vehicle 1. The illuminance sensor 140 may output the measured brightness information around the vehicle 1 to the processor 150.

The door locking device 160 may lock the door 100 of the vehicle 1 or unlock the door 100.

The memory 180 may store a reference image and a preset temperature range.

The memory 180 may store a program that performs the above-described operation and an operation described later, and the processor 150 may execute the stored program. When the memory 180 and the processor 150 are plural, they may be integrated into one chip, or may be provided in physically separate locations. The memory 180 may include a volatile memory such as a static random access memory (S-RAM) and a dynamic random access memory (Dlap) for temporarily storing data. In addition, the memory 180 may include non-volatile memory such as a ROM (Read Only Memory), an Erasable Programmable Read Only Memory (EPROM), and an EEPROM (Electrically Erasable Programmable Read Only Memory: EEPROM) for storing control programs and control data for a long time. The processor 150 may include various logic circuits and operation circuits, may process data according to a program provided from the memory 180, and may generate a control signal according to the processing result.

The processor 150 may determine whether the distance to the object measured by the first sensor 110 satisfies a condition for performing heat sensing. In addition, the processor 150 may activate the second sensor 120 when the distance to the object satisfies a thermal sensing performance condition.

The processor 150 may determine whether the temperature of the object measured by the second sensor 120 satisfies a condition for performing facial recognition. The processor 150 may activate the camera 130 when the temperature of the object satisfies the condition for performing facial recognition.

The processor 150 may control the door locking device 160 based on the image acquired by the camera 130. In this case, if the similarity between the image acquired from the camera 130 and the reference image stored in the memory 180 is greater than or equal to a preset value, the processor 150 may control the door locking device 160 to unlock the door 100.

Figure 3:
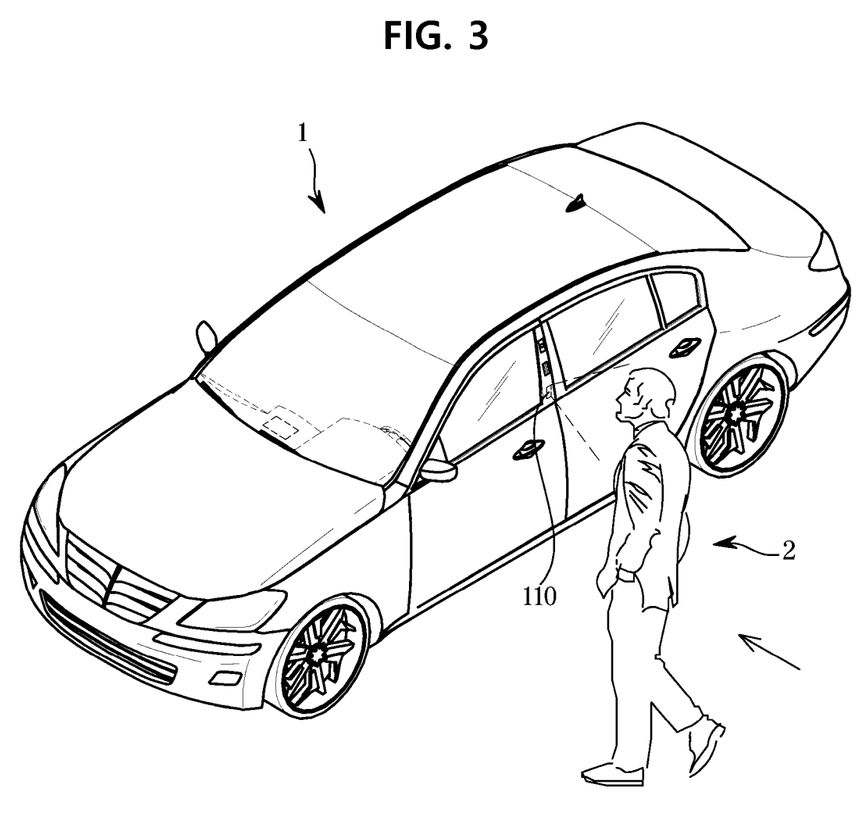
FIG. 3 is a diagram for describing an example in which a person approaches a vehicle in an embodiment of the present disclosure.
Figure 4:
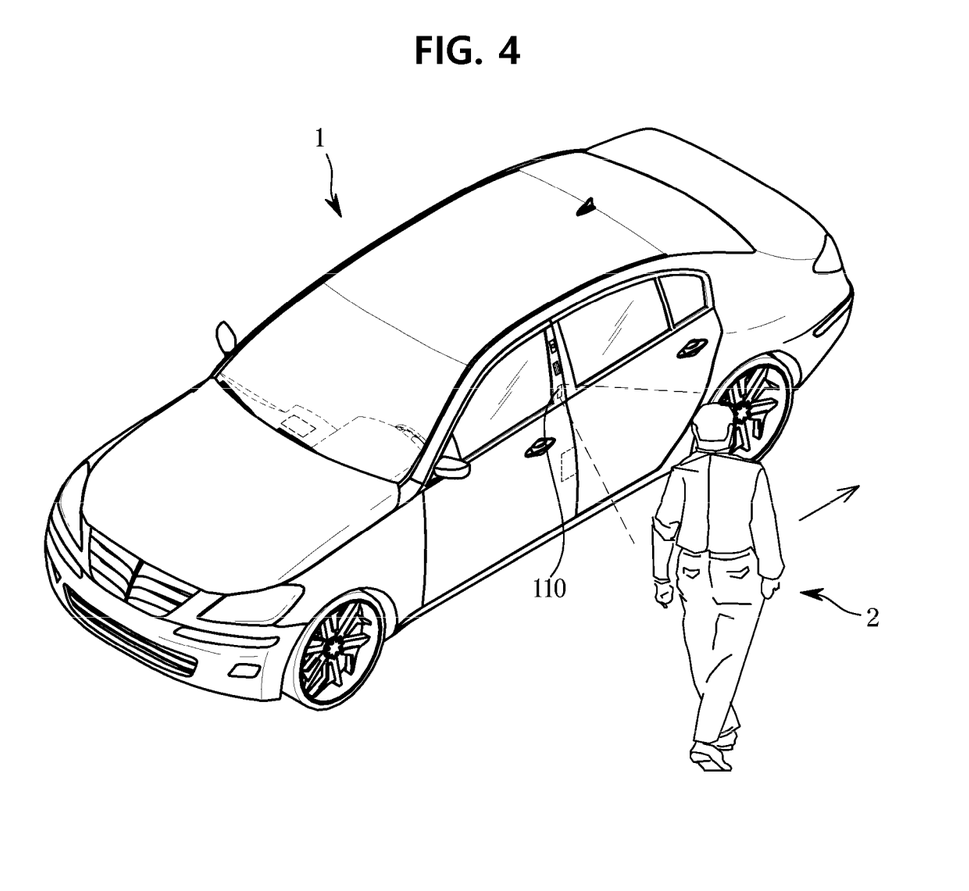
FIG. 4 is a diagram for explaining an example in which an object passes near a vehicle in an embodiment of the present disclosure.
Figure 5:
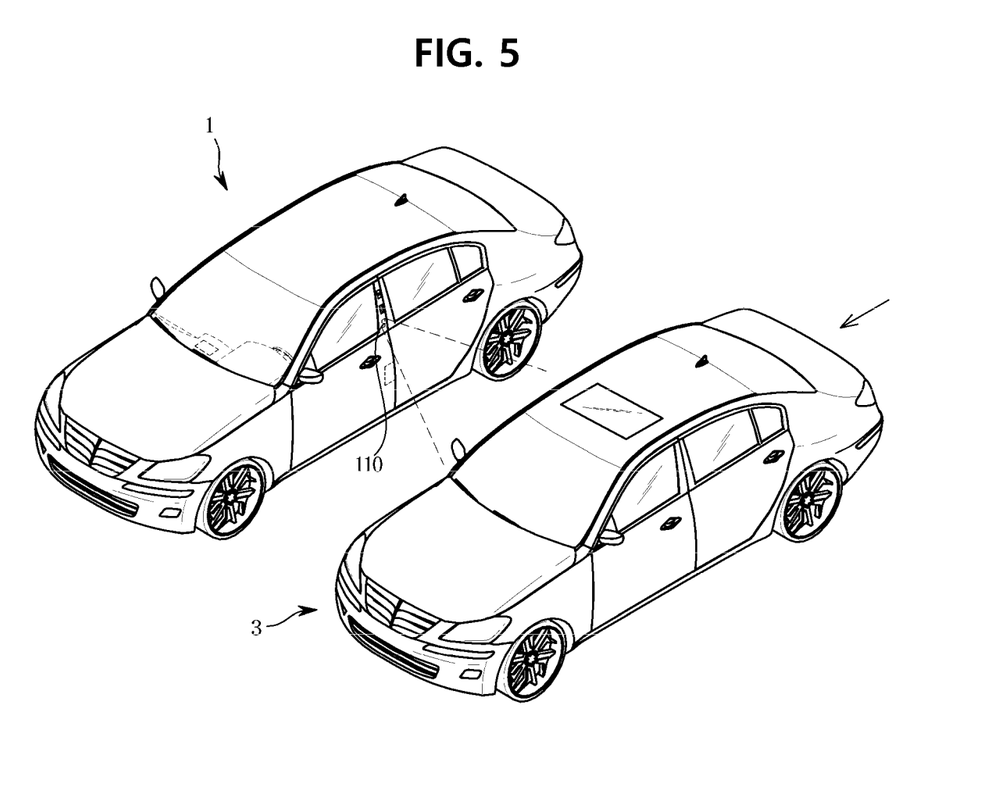
FIG. 5 is a diagram for explaining an example in which an object other than a person approaches a vehicle in an embodiment of the present disclosure.

FIG. 3 is a diagram for describing an example in which a person approaches a vehicle in an embodiment of the present disclosure. FIG. 4 is a diagram for explaining an example in which an object passes near a vehicle in an embodiment of the present disclosure. FIG. 5 is a diagram for explaining an example in which an object other than a person approaches a vehicle in an embodiment of the present disclosure.

Figure 6A:
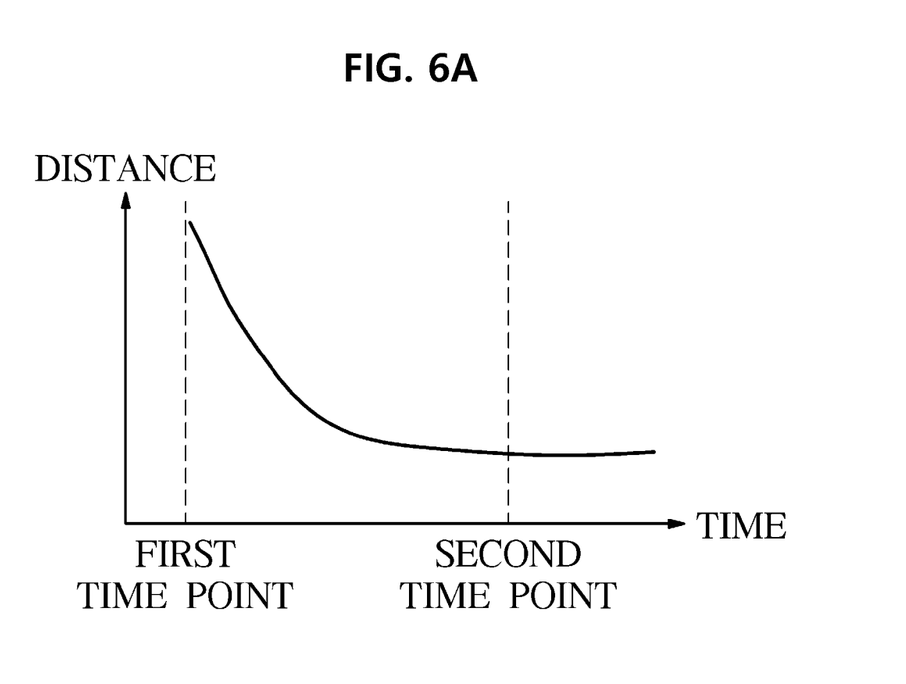
FIGS. 6A, 6B, 6C and 6D are graphs showing a change in distance measured according to each example.
Figure 6B:
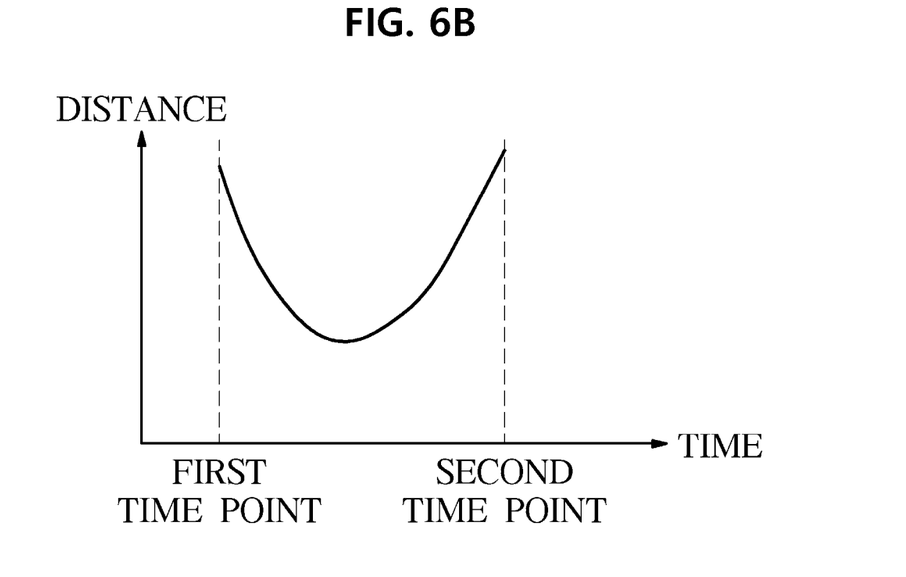
Figure 6C:
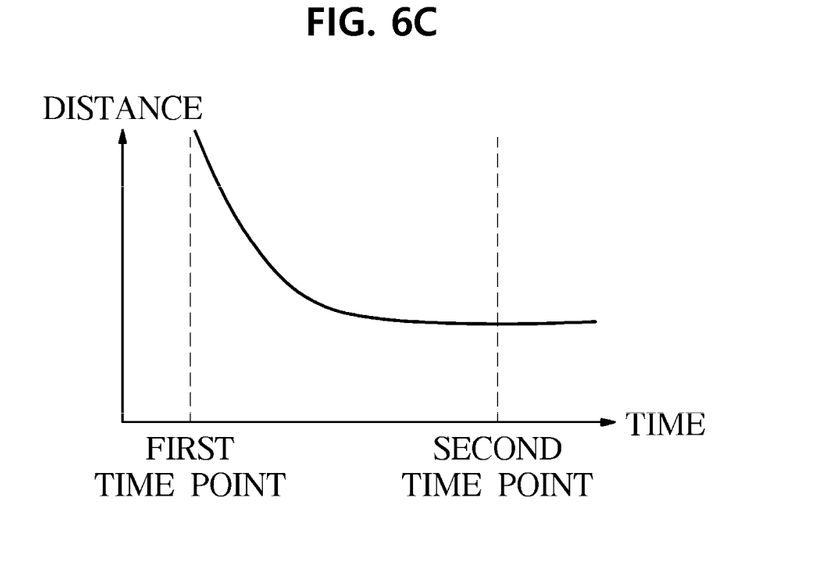
Figure 6D:
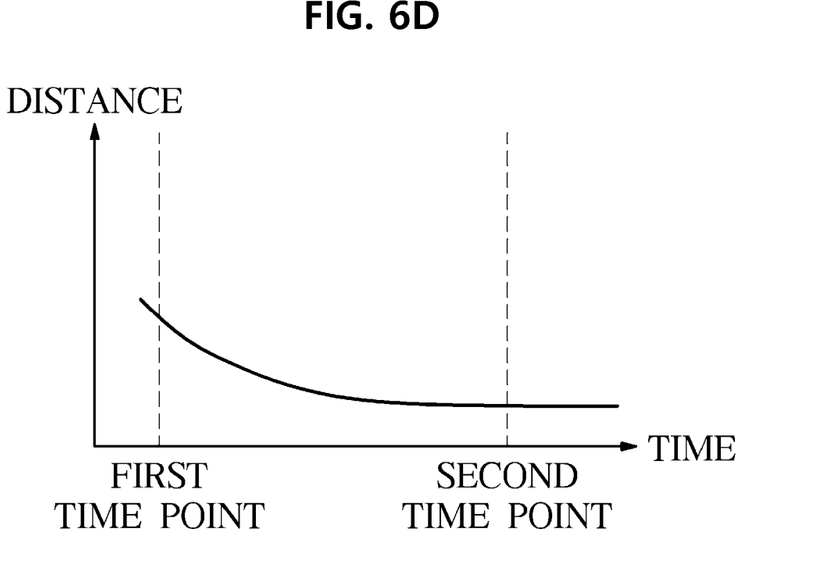

FIGS. 6A, 6B, 6C and 6D are graphs showing a change in distance measured according to each example. Specifically, FIG. 6A is a graph for explaining an example in which a person approaches a vehicle in an embodiment of the present disclosure, FIG. 6B is a graph for explaining an example in which an object passes near a vehicle in an embodiment of the present disclosure, FIG. 6C is a graph for explaining an example in which an object other than a person approaches a vehicle in an embodiment of the present disclosure, and FIG. 6D is a graph for explaining an example in which a person approaches a vehicle in a situation where an object other than a person already exists next to the vehicle in an embodiment of the present disclosure.

The object can approach the vehicle 1 from outside the vehicle and can pass near the vehicle 1. The object may be a person 2 or a non-human object 3.

The thermal sensing performance condition is a condition related to a distance to an object that must be satisfied in order for the processor 150 to activate the second sensor 120.

The first time point is an arbitrary point in time at which the first sensor 110 measures the distance to the object, and the second time point is a point in time after a predetermined time has elapsed from the first time point.

Referring to FIGS. 3 and 6A, the first sensor 110 may measure a distance to an object approaching the vehicle 1. In this case, the object may be a person 2.

As the person 2 gradually approaches the vehicle 1, the distance to the object measured by the first sensor 110 may gradually decrease. Accordingly, the distance to the object may be shorter at the second time point at which a predetermined time has elapsed, than the distance to the object at the first time point.

The processor 150 may determine that the distance to the object satisfies the thermal sensing performance condition when a value obtained by subtracting the distance to the object at the second time point from the distance to the object at the first time point is equal to or greater than a preset value. In this case, the processor 150 may activate the second sensor 120 by determining that the object approaches the vehicle 1.

Referring to FIGS. 4 and 6B, the first sensor 110 may measure a distance to an object passing near the vehicle 1. In this case, the object may be a person 2 or an object 3 that is not a person.

As the object gradually approaches the vehicle 1, the distance to the object measured by the first sensor 110 gradually decreases, and thereafter, as the object passes near the vehicle 1 and moves away from the vehicle 1, the distance to the object measured by the first sensor 110 may gradually increase. At this time, as time passes, the distance to the object decreases from the distance to the object at the first time point and then increases again. Therefore, the distance to the object at the second time point may not be significantly different compared to the distance to the object at the first time point.

In this case, when a value obtained by subtracting the distance from the object at the second time point from the distance to the object at the first time point is less than a preset value, the processor may determine that the distance to the object does not satisfy the thermal sensing performance condition.

Referring to FIGS. 5 and 6C, the first sensor 110 may measure a distance to an object 3 that is not a person approaching the vehicle 1. In this case, the non-human object 3 may be another vehicle.

As the non-human object 3 gradually approaches the vehicle 1, the distance to the object measured by the first sensor 110 may gradually decrease. Accordingly, the distance to the object may be shorter at the second time point at which a predetermined time has elapsed, than the distance to the object at the first time point.

The processor 150 may determine that the distance to the object satisfies the thermal sensing performance condition if a value obtained by subtracting the distance to the object at the second time point from the distance to the object at the first time point is equal to or greater than a preset value. In this case, the processor 150 may activate the second sensor 120 by determining that the object approaches the vehicle 1.

Referring to FIG. 6D, the first sensor 110 is the distance from the person 2 approaching the vehicle 1 in a situation where there is an object 3 other than a person next to the vehicle 1. In the case of FIG. 6D, since the first sensor 110 was measuring the distance to the non-personal object 3 next to the vehicle 1 before the person 2 approached, therefore the distance to the object at the first time point may be shorter than in the case of FIG. 6A.

In this case, as the person gradually approaches the vehicle 1, the distance to the object measured by the first sensor 110 may gradually decrease. Accordingly, the distance to the object may be shorter at the second time point at which a predetermined time has elapsed, than the distance to the object at the first time point.

The processor 150 may determine that the distance to the object satisfies the thermal sensing performance condition if a value obtained by subtracting the distance to the object at the second time point from the distance to the object at the first time point is equal to or greater than a preset value. In this case, the processor 150 may activate the second sensor 120 by determining that the object approaches the vehicle 1.

Referring to FIGS. 6A, 6B, 6C and 6D, the processor 150 may determine whether the object approaches the vehicle 1 and whether the object passes near the vehicle 1 based on the distance to the object at the first time point and the object at the second time point. The processor 150 may activate the second sensor 120 in the situations of FIGS. 6A, 6C and 6D when it is determined that the object approaches the vehicle 1.

However, referring to FIGS. 6A and 6C, although it may be known that the object approaches the vehicle 1, it may not be possible to distinguish whether the approached object is a person 2 or a non-human object. Therefore, from the contents to be described later, the camera 130 is not activated only by the fact that the object approaches the vehicle, but determines whether the object is a person based on the temperature of the object measured by the second sensor 120, and when it is determined that the object is a person, a process of activating the camera 130 will be described.

Figure 7:
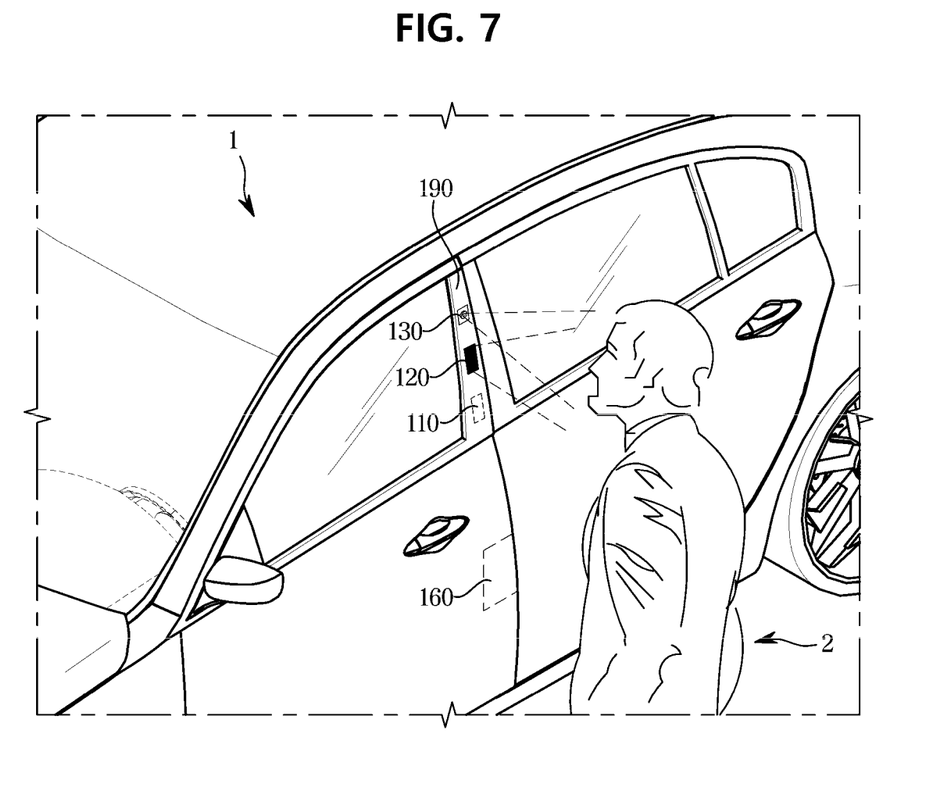
FIG. 7 is a diagram illustrating that a second sensor measures a temperature of an object and that a camera acquires an image of the object according to an exemplary embodiment of the present disclosure.

FIG. 7 is a diagram illustrating that a second sensor measures a temperature of an object and that a camera acquires an image of the object according to an exemplary embodiment.

Referring to FIG. 7, the second sensor 120 may measure the temperature of an object.

The condition for performing facial recognition is a temperature condition of an object that must be satisfied in order for the processor 150 to activate the camera 130.

When the temperature of the object is within a preset temperature range, the processor 150 may determine that the temperature of the object satisfies the condition for performing facial recognition. In this case, the processor 150 may determine that the object is the person 2 and activate the camera 130.

The preset temperature range may be a temperature range that is a reference for determining whether the temperature of the object is similar to that of a person. In addition, the preset temperature range may be 30 degrees Celsius or more and less than 42 degrees Celsius.

The camera 130 may acquire an image of an object. In this case, the object may be a person 2.

The processor 150 may control the door locking device based on the image acquired from the camera 130. Specifically, if the similarity between the image acquired from the camera 130 and the reference image is greater than or equal to a preset value, the processor 150 may control the door locking device 160 to unlock the door 100.

In this case, the reference image may be an image of a registered user. The registered user's image may be a face image of a person who is permitted to unlock the door 100 of the vehicle 1. The reference image may be previously stored in the memory 180, and a plurality of reference images may exist.

Figure 8:
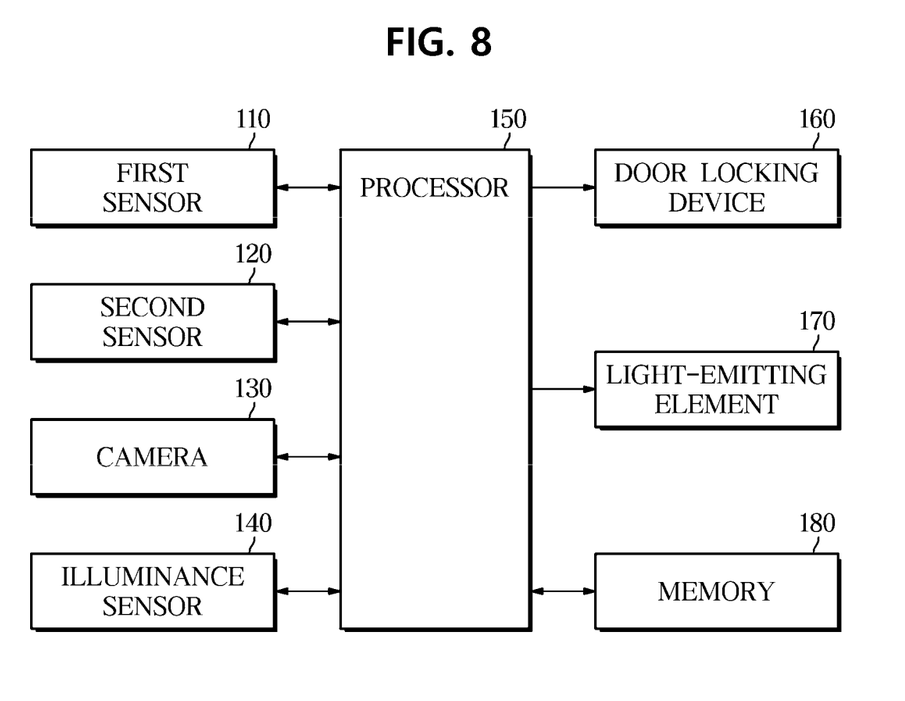
FIG. 8 illustrates a control block diagram of a vehicle according to another embodiment of the present disclosure.

FIG. 8 illustrates a control block diagram of a vehicle according to another embodiment of the present disclosure.

Referring to FIG. 8, the vehicle 1 includes a first sensor 110, a second sensor 120, a camera 130, an illuminance sensor 140, a processor 150, a door locking device 160, and a light emitting device 170 and a memory 180.

The first sensor 110 may measure a distance to an external object of the vehicle 1, and the second sensor 120 may measure a temperature of an external object of the vehicle 1.

The processor 150 may activate the second sensor 120 when the distance to the object measured from the first sensor 110 satisfies the thermal sensing performance condition.

The processor 150 may activate the camera 130 when the temperature of the object measured by the second sensor 120 satisfies the condition for performing facial recognition.

The processor 150 may activate the illuminance sensor 140 when the temperature of the object measured by the second sensor 120 falls within a preset temperature range. That is, the processor 150 may activate the illuminance sensor 140 when the temperature of the object satisfies the condition for performing facial recognition. The processor 150 may activate the illuminance sensor 140 when it is determined that the object approaching the vehicle 1 is a person.

The processor 150 may drive the light emitting element 170 based on the brightness around the vehicle 1 measured by the illuminance sensor 140. At this time, the processor 150 may drive the light emitting element 170 when the brightness around the vehicle 1 is darker than the preset brightness, and the preset brightness may be the brightness around the vehicle 1 that is a reference for determining whether to irradiate light onto the object.

The processor 150 may drive the light emitting element 170 based on the brightness around the vehicle 1 measured by the illuminance sensor 140. At this time, the processor 150 may drive the light emitting element 170 when the brightness around the vehicle 1 is darker than the preset brightness, and the preset brightness is a vehicle that is a reference for determining whether to irradiate light to the object. It can be the brightness of the surroundings.

The light emitting element 170 may irradiate light onto an object. The light emitting element 170 may be one of an infrared light emitting diode (IR LED) or a laser diode, and may be a different type of light source device. The light emitting element 170 may be embedded in the camera 130 or may be provided on the side of the vehicle 1.

The camera 130 may acquire an image of an object to which light from the light emitting element 170 is irradiated. Even if the brightness around the vehicle 1 is dark, the camera 130 may acquire an image of the object based on the light emitted by the light emitting element 170 to the object.

If the similarity between the acquired object image and the reference image is equal to or greater than a preset value, the processor 150 may control the door locking device 160 to unlock the door 100.

If the similarity between the acquired object image and the reference image is less than a preset value, the processor 150 may determine that the object is not a registered user and turn off the illuminance sensor 140 that has activated. At this time, the processor 150 may also turn off the camera 130 and the second sensor 120.

Figure 9:
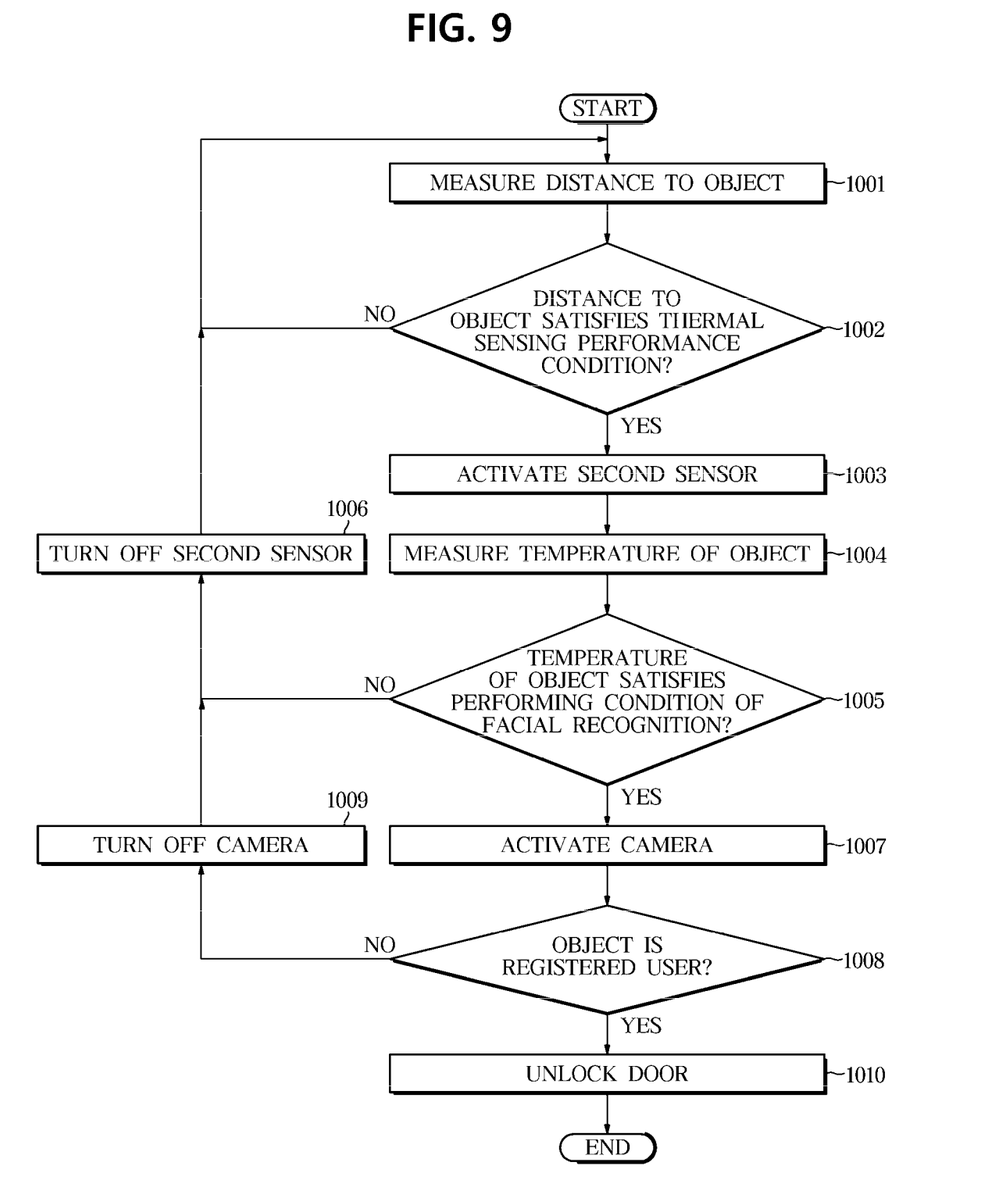
FIG. 9 is a flowchart illustrating a procedure for unlocking a door according to an exemplary embodiment of the present disclosure.

FIG. 9 is a flowchart illustrating a control method for unlocking a door according to an exemplary embodiment of the present disclosure. This is only an example for achieving the object of the present disclosure, and some configurations may be added or deleted as necessary.

Referring to FIG. 9, the first sensor 110 may measure a distance to an object (1001). In this case, the first sensor 110 may measure a distance to the object at a first time point and a distance to the object at a second time point. The first sensor 110 may output the measured distance to the object, the distance to the object at the first time point, and the distance information to the object at the second time point to the processor 150.

The processor 150 may determine whether the distance to the object satisfies a condition for performing heat sensing (1002). In this case, the processor 150 determines that the distance to the object satisfies the thermal sensing performance condition if the value obtained by subtracting the distance to the object at the second time point from the distance to the object at the first time point is equal to or greater than a preset value.

The processor 150 activates the second sensor 120 when it is determined that the condition for performing thermal sensing performance condition is satisfied (1003). That is, the processor 150 activates the second sensor 120 when it is determined that the object approaches the vehicle 1.

The second sensor 120 may measure the temperature of the object (1004). In this case, the second sensor 120 may output the measured temperature information of the object to the processor 150.

The processor 150 may determine whether the temperature of the object satisfies the condition for performing facial recognition (1005). In this case, when the temperature of the object is within a preset temperature range, the processor 150 may determine that the temperature of the object satisfies the condition for performing facial recognition.

When the processor 150 determines that the condition for performing facial recognition is satisfied, the processor 150 may activate the camera 130 (1007). That is, the processor 150 activates the camera 130 when it is determined that the object is a person.

When the temperature of the object is outside the preset temperature range, the processor 150 may determine that the temperature of the object does not satisfy the condition for performing facial recognition and turn off the second sensor 120 (1006). That is, when it is determined that the object is not a person, the processor 150 may not activate the camera 130 and may turn off the second sensor 120 that has activated.

The camera 130 may acquire an image of an object. In this case, if the similarity between the image acquired from the camera 130 and the reference image is equal to or greater than a preset value, the processor 150 may determine that the object is a registered user (1008).

If the processor 150 determines that the object is a registered user, the processor 150 may unlock the door 100 (1010). In this case, the processor 150 may unlock the door 100 by controlling the door locking device 160.

When the similarity between the image acquired from the camera 130 and the reference image is less than a preset value, the processor 150 may determine that the upper body is not a registered user, and may turn off the camera 130 that has activated (1009). At this time, the processor 150 may also turn off the second sensor 120 that has been awakened (1006).

The disclosed embodiments may be implemented in the form of a recording medium storing instructions executable by a computer. The instruction may be stored in the form of a program code, and when executed by a processor, a program module may be generated to perform the operation of the disclosed embodiments. The recording medium may be implemented as a computer-readable recording medium.

The non-transitory computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

According to an aspect of the present disclosure, it is possible to provide a vehicle capable of determining whether an object approaches a vehicle and determining whether to activate a camera based on a temperature of the approaching object.

According to an aspect of the present disclosure, when the object approaching the vehicle is determined to be a human, the camera performing facial recognition activates, so that it is possible to prevent unnecessary current from flowing through the camera and to prevent the vehicle from being discharged.

The above description is illustrative of the present disclosure. Further, the above disclosure is intended to illustrate and explain exemplary embodiments of the present disclosure, and the present disclosure may be used in various other combinations, modifications, and environments. In other words, the present disclosure may be changed or modified within the scope of the concept of the disclosure disclosed herein, within the equivalent scope of the disclosure, and/or within the skill and knowledge of the art. The described embodiments illustrate the best state of the art to implement the technical idea of the present disclosure, and various changes may be made thereto as demanded for specific applications and uses of the present disclosure. Accordingly, the above description is not intended to limit the present disclosure to the embodiments. Further, the appended claims should be construed as encompassing such other embodiments

What is claimed is:

1. A vehicle, comprising:
   a first sensor configured to measure a distance to an object;
   a second sensor configured to measure a temperature of the object;
   a camera configured to acquire an image of the object; and
   a controller configured to:
   identify a first distance to the object measured at a first time point by the first sensor and a second distance to the object measured at a second time point by the first sensor,
   when the second distance is shorter than the first distance and a value obtained by subtracting the second distance from the first distance is equal to or greater than a preset value, determine that a condition for performing heat detection is satisfied,
   when the value obtained by subtracting the second distance from the first distance is less than the preset value, identify a change in distance to the object measured by the first sensor between the first time point and the second time point, when the identified change in distance to the object changes from a decreasing state to an increasing state, determine that the condition for performing heat detection is not satisfied, activate the second sensor in response to determining that the condition for performing heat detection is satisfied, maintain the second sensor to be turned off in response to determining that the condition for performing heat detection is not satisfied, and activate the camera when the temperature of the object measured by the activated second sensor satisfies a condition for performing facial recognition.

2. The vehicle according to claim 1, further comprising a door locking device configured to lock a door of the vehicle or unlock the door, wherein the processor is configured to control the door locking device based on the acquired image from the camera.

3. The vehicle according to claim 2, wherein the processor is configured to control the door locking device to unlock the door when a similarity between the image acquired from the camera and a reference image is greater than or equal to a preset similarity value.

4. The vehicle according to claim 1, wherein the processor is configured to activate the camera when the temperature of the object is within a preset temperature range.

5. The vehicle according to claim 1, further comprising an illuminance sensor configured to measure a brightness around the vehicle, wherein the processor is configured to activate the illuminance sensor when the temperature of the object measured by the second sensor falls within a present temperature range.

6. The vehicle according to claim 1 further comprising a light-emitting element provided in the camera, wherein the processor is configured to drive the light-emitting element based on brightness around the vehicle.

7. The vehicle according to claim 1, wherein the processor is configured to turn off the second sensor when the temperature of the object measured from the second sensor is outside a present temperature range.

8. The vehicle according to claim 3, wherein the processor is configured to turn off the second sensor and the camera when the similarity between the image acquired from the camera and the reference image is less than the preset similarity value.

9. The vehicle according to claim 1, wherein the camera is disposed on a B-pillar or A-pillar of the vehicle.

10. The vehicle according to claim 1, wherein, in order to minimize power consumption, the first sensor is configured to:

operate at intervals of a first period when no object is detected, and operate at intervals of a second period when the object is detected, wherein the first period is longer than the second period.

11. A controlling method of a vehicle, comprising:

identifying a first distance to the object measured at a first time point by a first sensor and a second distance to the object measured at a second time point by the first sensor;

when the second distance is shorter than the first distance and a value obtained by subtracting the second distance from the first distance is equal to or greater than a preset value, determining, by a controller, that a condition for performing heat detection is satisfied;

when the value obtained by subtracting the second distance from the first distance is less than the preset value, identifying, by the controller, a change in distance to the object measured by the first sensor between the first time point and the second time point;

when the identified change in distance to the object changes from a decreasing state to an increasing state, determining, by the controller, that the condition for performing heat detection is not satisfied;

maintaining, by the controller, a second sensor to be turned off in response to determining that the condition for performing heat detection is not satisfied;

activating, by the controller, the second sensor in response to determining that the condition for performing heat detection is satisfied;

measuring a temperature of the object by the activated second sensor; and activating, by the controller, a camera when the temperature of the object satisfies a condition for performing facial recognition.

12. The method of claim 11, further comprising controlling a door locking device based on the acquired image from the camera.

13. The method of claim 12, wherein the controlling a door locking device includes unlocking the door when a similarity between the image acquired from the camera and a reference image is greater than or equal to a preset similarity value.

14. The method of claim 11, further comprising determining whether to activate the second sensor based on a first distance to the object at a first time point and a second distance to the object at a second time point, wherein the determining whether to activate the second sensor includes activating the second sensor when a value obtained by subtracting the second distance to the object from the first distance to the object is equal to or greater than a preset value.

15. The method according to claim 11, wherein the activating a camera includes activating the camera when the temperature of the object is within a preset temperature range.

16. The method according to claim 11, further comprising activating an illuminance sensor when the temperature of the object measured by the second sensor falls within a preset temperature range.

17. The method according to claim 16, further comprising:

measuring a brightness around the vehicle by the illuminance sensor; and driving a light-emitting element based the brightness around the vehicle.

18. The method according to claim 11, further comprising turning off the second sensor when the temperature of the object measured from the second sensor is outside a present temperature range.

19. The method according to claim 13, further comprising turning off the second sensor and the camera when the similarity between the image acquired from the camera and the reference image is less than the preset similarity value.

20. The method according to claim 11, further comprising:

operating the first sensor at intervals of a first period when no object is detected, in order to minimize power consumption; and operating the first sensor at intervals of a second period when the object is detected, wherein the first period is longer than the second period.

* * * * *